April 2, 1929.  C. J. SCANLAN  1,707,322
ELECTRIC WATER HEATER
Filed Feb. 8, 1926
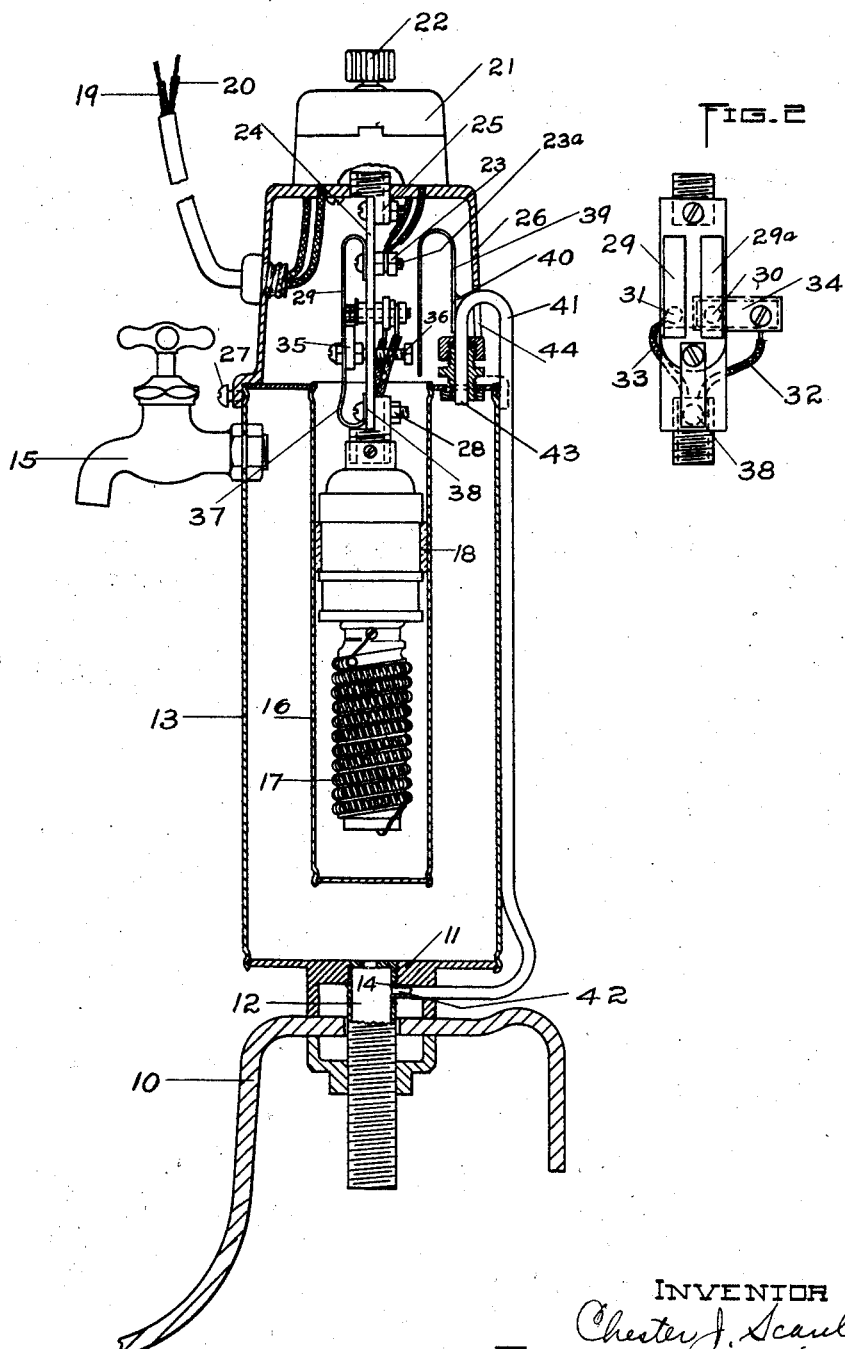

Patented Apr. 2, 1929.

1,707,322

UNITED STATES PATENT OFFICE.

CHESTER J. SCANLAN, OF BLOOMINGTON, ILLINOIS.

ELECTRIC WATER HEATER.

Application filed February 8, 1926. Serial No. 86,766.

This invention relates to water heaters of the type heated by an electric resistance element, and more particularly, to switch mechanism therefor controlled by a thermal element directly connected with the water portion thereof and operating from conducted heat.

One of the objects of the invention is in the provision of a switch member for a water heater fashioned with a thermal controlling agent, such agent being directly attached to the hot water portion of the heater in a manner to be operated by conducted heat.

Another object of the invention is in the provision of switch mechanism for electric water heaters, said switch member being fashioned in a manner to quickly open the electric circuit when the desired temperature of the water has been reached, and this quick action being effected directly by a thermal element attached to the hot water portion of the heater in a manner to be operated by conducted heat rather than convected heat.

A still further object is in the provision of a by-pass for a portion of the water delivered to the heater, said by-pass having a thermal element attached thereto in a manner to control switch mechanism governing the electric current to the heater.

Other objects of the invention will appear in the following specification, taken in connection with the annexed drawings, in which—

Fig. 1 is an elevation, partially in section, showing the application of the switch member to the general water heater installation;

Fig. 2 is an enlarged detail of a portion of the thermal switch mechanism.

Referring to the drawings, a portion of the conventional wash bowl is shown at 10, fashioned to receive the electric water heater in the manner disclosed, wherein the lower portion 11 of the water heater is fashioned for threaded engagement with the main water pipe 12. The water heater comprises an outer cylindrical casing 13, suitably attached to the base portion 11. This base portion 11 is fashioned to provide a receiving portion 14 for one end of a by-pass, later to be described. An ordinary faucet 15 engages the outer casing and provides means for drawing off the water content therein. An inner cylindrical casing 16 furnishes a water tight housing for the electric resistance element, in the present instance referred to as 17, the same being conventional in design. Means for seating the resistance element with respect to the inner cylindrical casing in a non-moisture absorbing position is provided in an asbestos wrapping 18.

In view of the fact that the water heater, per se, has been fully described in my co-pending application, Serial No. 64,309, filed October 23, 1925, only a general reference to such heater has been made.

Referring specifically to the electric circuit and switches contained therein, which forms the basis for the present application, we find the wires 19 and 20 which are connected in the main line circuit. These wires pass through a conventional switch member described generally as 21, the details of which are so conventional as to require no description. The well known switch button for controlling the same is shown at 22. This provides a manual controlling means to start or stop operation of the heater.

The electric wires 19 and 20 are connected to the binding post 23 on the switch member, which controls the operation of the heater. An insulated plate 24 is suitably attached, as at 25, to a housing member 26, which has optional detachable relationship with the upper end of the heater by means of the set screw 27. Similarly, the resistance element is fixedly attached as at 28 to the lower end of the insulated plate 24.

The switch mechanism comprises the following elements: The opposite ends of the binding posts 23 and 23ª have attached thereto the spring contact members 29 and 29ª. Upon the lower ends of the above mentioned contact members are disposed the actual contact points which are fashioned to engage opposed points on binding posts 30 and 31, which have direct connection with the resistance element through the wires 32 and 33, there being a fuse member 34 inserted between the binding post 30 and the wire 32 leading to the resistance element. The above mentioned connections between the main line circuit and the resistance element, in themselves, complete an electric circuit to the resistance element. Nevertheless, due to the fact that the electric circuit must be broken upon the temperature of the water in the heater attaining a certain degree, there must necessarily be provided a means for opening this electric circuit at a determined time. Such means is provided in the following elements:

The lower ends of the spring contacts 29 and 29ª are engaged by a lug 35, attached to a binding post 36, slidably related to insulated plate 24. This lug 35 normally assumes such position as will permit the contacts 29 and 29ª to abut the opposed contacts on the binding posts 30 and 31, the position of such lug being controlled, in one instance, by a flat spring 37 attached at one end to the binding post 36 at a point adjacent said lug, and at its opposite end at the point 38 to the insulated plate 24.

The actual means for moving the slidable binding post 36 to accomplish the opening of the electric circuit to the resistance member by moving the contact levers 29 and 29ª away from their opposed contacts, is provided in the bi-metallic strip 39, the same having its movable end located adjacent one end of the slidable binding post 36. This thermal strip 39 has its fixed end suitably attached as at 40 to a water by-pass 41, said water by-pass having its lower end opening into the main water inlet at 42, and its upper end opening into the upper end of the water heater at 43. Means providing a water-tight connection with the water inlet and the water heater for the opposed ends of the by-pass are provided. Similarly, to permit ready removal of the housing 26, there is provided a slot 44, which permits sliding of the housing 26 over the projecting portion of the by-pass. As before described, the fixed end of the thermal element 39 is attached to the by-pass at 40. However, it might be stated at this time that this connection is such that a considerable portion of the bi-metallic strip 39 actually abuts the water by-pass, the reason for this connection being to increase, as much as possible, the sensitiveness of the bi-metallic portion to the temperature of the water passing through the by-pass.

With respect to the operation of the water heater, and switch portions therefor, it might be stated that generally, the operation is similar to that of all electrical water heaters, in that the water is heated by an electric resistance element. However, in the present instance, the novelty lies in the manner of interrupting the electric circuit when the temperature of the water in the heater has attained a certain degree, and similarly, in the manner of re-establishing the electric circuit when the water in the heater has fallen below the desired temperature.

It is obvious that the commencement of the operation of the heater is controlled primarily by the switch button 22, controlling the main switch for the heater. Upon the turning of this switch to an "on" position, the electrical circuit is completed to the resistance element, and the heat rays therefrom immediately begin to heat the water. With the rising of the temperature of the water, there will be a corresponding movement of the temperature controlled bi-metallic strip 39, which will move in a manner to strike the sliding binding post 36, and finally, when the desired temperature has been reached, it moves same to a position to open the electrical circuit through the opposed contacts located on the contact members 29 and 29ª, and the binding posts 30 and 31.

In devices of the present type, namely, of small capacity, it is apparent that before hot water may be drawn off from the faucet, some time must be consumed in heating the water. With the present device, a very short time is required, and thereupon water may be drawn off. With such a small capacity heater, it is evident that when the normal capacity of the heater has been consumed, cold water from the main pipe 12 will enter the heater, whereupon, not only will the operator close the faucet, due to the fact that cold water is issuing therefrom, but also, the thermal element 39 will be cooled quickly by the water passing through the by-pass 41, and will be contracted to a position to again permit the completion of the electrical circuit to the resistance element, with a consequent heating of the water content. The by-pass 41 insures quick action of the thermal element 39, due to the fact that the cold water from the pipe 12 is passed directly to the thermal element rather than entering the lower part of the water heater, and necessarily having to cool perhaps a small volume of hot water still contained in the heater. By utilizing this by-passing of the cold water and the particular fashioning of the thermal element to be sensitive to the conducted heat therefrom, a quick acting switch controlling agent for the electrical circuit is provided with the improved results with respect to this type of heater that a much greater quantity of water may be heated and with much less consumption of time in such heating.

What I claim is:

In a device of the class described, the combination with an electric heater including a container, an electric heating element, means for accomplishing an operation of the electric heating element including a cold water inlet pipe for the container, a water by-pass connecting the cold water pipe and the container and a thermal switch member attached to the by-pass in a manner to be influenced by the temperature of the inlet water as well as the temperature of the water in the container.

In testimony whereof, I have hereunto affixed by signature.

CHESTER J. SCANLAN.